United States Patent [19]
Keesen et al.

[11] Patent Number: 4,758,889
[45] Date of Patent: Jul. 19, 1988

[54] VALUE CORRECTION METHOD

[75] Inventors: Heinz-Werner Keesen, Hanover; Wolfgang Hartnack, Hemmingen, both of Fed. Rep. of Germany

[73] Assignee: Deutsche Thomson-Brandt GmbH, Villingen-Schwenningen, Fed. Rep. of Germany

[21] Appl. No.: 26,683

[22] Filed: Mar. 17, 1987

[30] Foreign Application Priority Data

Mar. 18, 1986 [DE] Fed. Rep. of Germany ....... 3608914

[51] Int. Cl.$^4$ .......................................... H04N 7/133
[52] U.S. Cl. ...................................... 358/133; 375/26
[58] Field of Search ......................... 358/133; 375/26

[56] References Cited

U.S. PATENT DOCUMENTS

| 3,927,312 | 12/1975 | Dickinson | 364/730 |
| 4,524,447 | 6/1985 | Willis | 375/26 |
| 4,594,726 | 6/1986 | Willis | 375/26 |
| 4,694,336 | 9/1987 | Keesen | 358/133 |

FOREIGN PATENT DOCUMENTS

| 3309717 | 9/1984 | Fed. Rep. of Germany . |
| 3424078 | 1/1985 | Fed. Rep. of Germany . |
| WO/8403160 | 8/1984 | PCT Int'l Appl. . |

OTHER PUBLICATIONS

B. G. Teubner Stuttgart, Arithmetic in Rechenanlagen, Logik und Entwurf, S. 62 u. 63, 77 bis 81 (1976).
Patent Abstract of Japan p. 344, Mar. 28, 1985, vol. 9, No. 68.
Patent Abstract of Japan p. 83, Oct. 8, 1981, vol. 5, No. 157.

Primary Examiner—Howard W. Britton
Attorney, Agent, or Firm—Spencer & Frank

[57] ABSTRACT

A method and circuitry for correcting discreet values transmitted in blocks. Circuitry performs at least one multiplication as of matrixes to obtain at least one product value having a plurality of digits, while limiting the number of digits. The correction value is then added to the product value. In the preferred embodiment, multiplication is of matrixes representing blocks of chromaticity or gray values by a transformation matrix and the multiplication produces matrixes in the frequency region. In this embodiment, only a single correction value is calculated, which is added to the mean value element of the matrix obtained by the multiplication and which corresponds to a multiple of the arithmetic mean of all of the elements of the image region matrix.

14 Claims, 2 Drawing Sheets

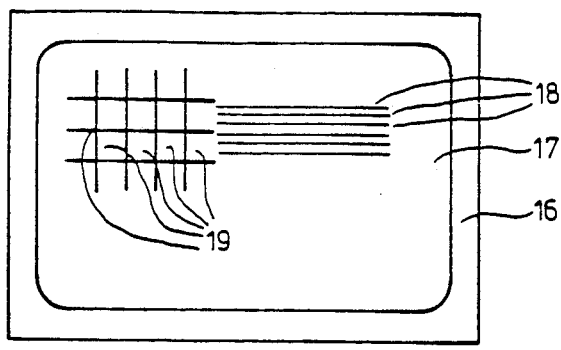
Fig. 4
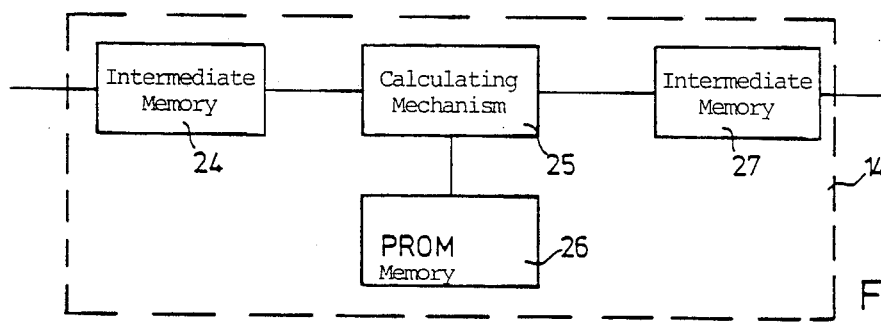
Fig. 5                          Fig. 6
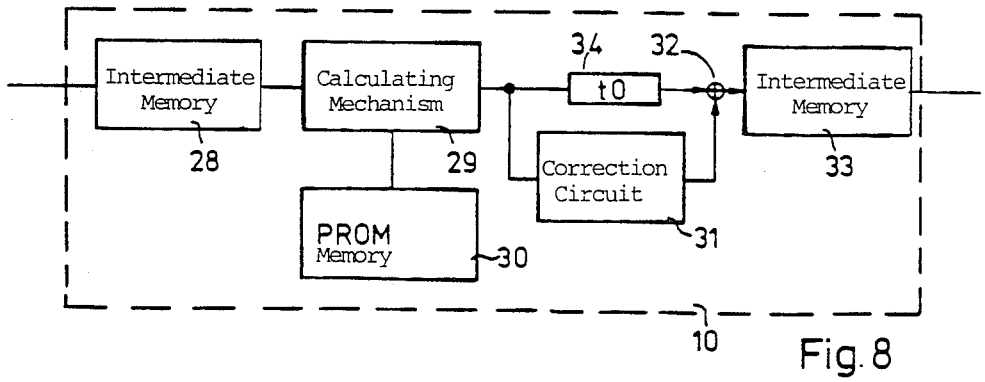
Fig. 7
Fig. 8

4,758,889

VALUE CORRECTION METHOD

BACKGROUND OF THE INVENTION

The invention relates to a method of correcting discrete values that are transmitted in blocks.

Pages 114 to 120 of the 1980 dissertation paper, entitled "Adaptive Transformationskodierung von digitalisierten Bildsignalen" [Adaptive Transformation Coding of Digitalized Video Signals] by Dipl.-Ing. [Certified Engineer] Wolfgang Mauersberger presented at the Technical University of Aachen describe the approximation of a matrix. Because of the real value matrix element, a calculating mechanism operating with a floating decimal point is proposed. The matrix elements A (I, J) are approximated (page 115, second paragraph).

SUMMARY OF THE INVENTION

It is the object of the invention to provide an improved method for the block-wise transmission of values.

This is accomplished in that, during one or a plurality of multiplications, the values are intentionally limited in their number of digits and, at the end of one or a plurality of multiplications, one or a plurality of correction values (MK) are added to the product or products.

In a transformation coding process, analog signals are digitalized and the digitalized signals are transformed from a time region to the frequency region. For this purpose the digitalized signals are arranged in matrixes. For the multiplication of matrixes, matrix elements are multiplied with one another by columns and rows and the products are added. For binary multiplication, the number of digits of the product results as the sum of the numbers of digits of the factors. After a plurality of successive multiplications, processing of all digits can no longer be realized in a computer employing only simple hardware. Depending on the accuracy desired, rounding errors may be permissible during the multiplication if care is taken afterwards that these rounding errors are compensated again.

For a better understanding of the invention, one embodiment thereof will be described in greater detail below with reference to the drawing figures.

BRIEF DESCRIPTION OF THE DRAWINGS

FIG. 4 depicts a screen.
FIG. 5 depicts a matrix with transformed values.
FIG. 6 depicts a matrix multiplication.
FIG. 7 is a block circuit diagram of an inverse discrete cosine transformation.
FIG. 8 depicts a correction circuit following a discrete cosine transformation.

DESCRIPTION OF THE PREFERRED EMBODIMENT

Figure 1:
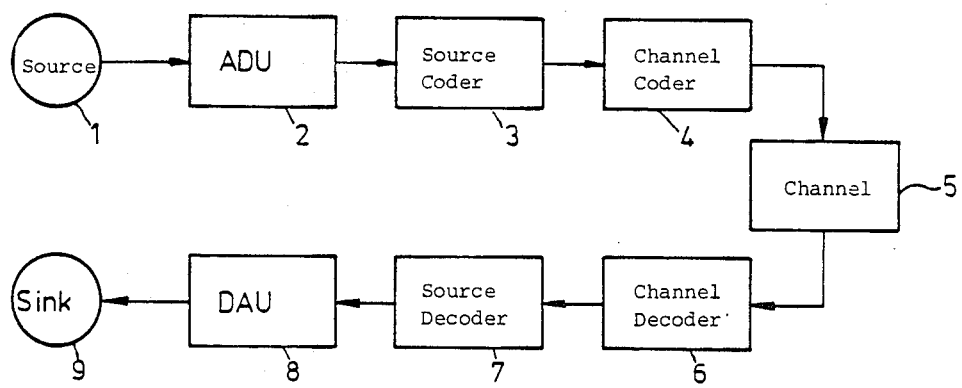
FIG. 1 depicts a data transmission system.

FIG. 1 depicts a data source 1, an ADU 2 (analog/-digital converter), a source coder 3, a channel coder 4, a channel 5, a channel decoder 6, a source decoder 7, a DAU 8 (digital/analog converter) and a data sink 9. Channel 5 may, for example, represent an HF transmission path or a digital video recorder. However, a digital video recorded may also be used, for example, for the ADU 2, source coder 3, channel coder 4, channel 5, channel decoder 6, source decoder 7 and DAU 8. The source is then formed by an HF transmission path, channel 5 by a magnetic tape and a magnetic head in the video recorder, the sink is a television receiver.

Figure 2:
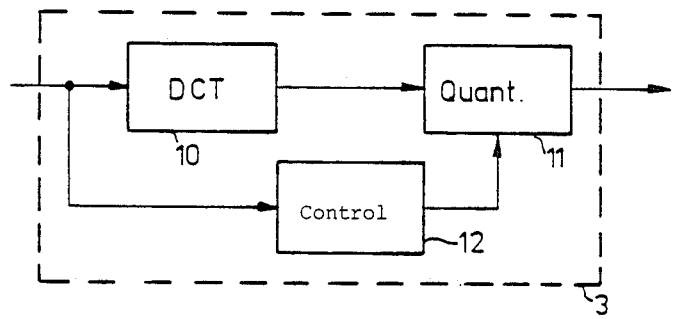
FIG. 2 depicts a source coder.

FIG. 2 depicts a source coder 3 including a discrete cosine transformer 10, a quantizer 11 and a control 12. In the discrete cosine transformer 10, discrete digital signals arranged in blocks are transformed from the time region to the frequency region. This corresponds to a mathematical multiplication of matrixes. The values transformed to the frequency region are quantized in quantizer 11. With reference to quantizing see also pages 29 et seq. of the dissertation paper by Mauersberger. Control 12 takes care of adding control and address signals.[1] The output of quantizer 11 leads to channel coder 4.

[1] Translator's note: The German work "Zeichen", here translated as signal, could also be translated as character.

Figure 3:
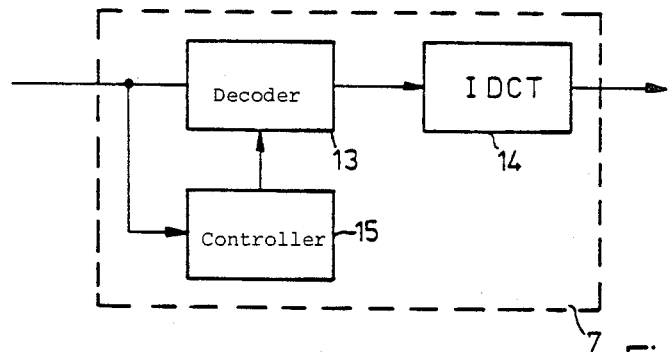
FIG. 3 depicts a source decoder.

FIG. 3 depicts a source decoder 7 including a decoder 13, an inverse discrete cosine transformer 14 and a controller 15. Controller 15 sorts the control and address signals out of the incoming transmitted values and takes care that the decoder transmits data words only (in contrast to control words and addresses) to inverse transformer 14. Inverse transformer 14 transforms quantized frequency values transmitted via channel 5 to the time region.

FIG. 4 depicts a television receiver 16 and a screen 17. Lines 18 can be seen on screen 17. Three television lines 18 pass through each block 19. Blocks 19 hold a defined number of pixels and are arranged in a square. In this embodiment, blocks 19 hold a block of 3×3 pixels. In practice, a block of 8×8 pixels is used. The gray and chromaticity values of the pixels in the blocks form the elements of the matrixes of the image region.

FIG. 5 depicts a 4×4 matrix, the coefficient matrix, with values transformed to the frequency region. Matrix value 20 disposed in the first row and the first column, i.e. element K(1,1), is a measure of the equal value component, hereinafter called mean value, of a block.

FIG. 6 depicts a mathematical equation employing matrixes, where matrixes 21 and 22 are multiplied with one another and the product is matrix 23.

FIG. 7 depicts an inverse discrete cosine transformer 14 in which frequency values are retransformed to the time region. The frequency region values are intermediately stored in intermediate memory 24 and fed to calculating mechanism 25. In calculating mechanism 25, the frequency region values which are arranged in blocks in the form of matrixes, are retransformed to the image region. For this purpose, calculating mechanism 25 turns to PROM 26 and obtains from there the stored matrixes. The formation of such matrixes for a discrete transformation or discrete cosine transformation (DCT) is described, for example at pages 20 to 25 of the dissertation paper by Robert Sell, entitled "Ein Beitrag zur Informationsreduktion bei Fernsehbildsignalen mit Transformationscodierung und adaptiver Quantisierung" [A Contribution Toward The Reduction Of Information In Television Signals By Means Of Transformation Coding And Adaptive Quantization], presented in 1979 at the Gesamthochschule [Universal College]of Wuppertal. The operation of calculating mechanisms is described in the TTL Cookbook by Texas Instruments, for example at pages 226 to 228. Intermediate memory 27 takes up the gray and chromaticity values transformed to the image region and transfers them to a monitor or a television receiver, respectively.

FIG. 8 depicts a discrete cosine transformer 10 in which image region values are transformed to the frequency region. Image region values are intermediately stored in intermediate memory 28 and are fed from there to a calculating mechanism 29. Calculating mechanisms 29 turns to a further PROM memory 30 which supplies it with matrix elements. Calculating mechanism 29 multiplies matrixes with one another and thus produces frequency region values from the image region values, hereinafter called coefficients. The coefficients, which are arranged in blocks, are transferred via an addition circuit 32 to an intermediate memory 33. The following calculation is performed during a transformation, e.g. DCT:

$$(K)=(DCT)*(B)*(DCT)^{-1}$$

For retransformation or inverse transformation, the calculation goes as follows:

$$(B)=(DCT)^{-1}*(K)*(DCT)$$

where
(B)=pixel matrix
(K)=coefficient matrix
(DCT)=transformation matrix
$(DCT)^{-1}$=inverse transformation matrix To keep calculating mechanism 29 as simple as possible, it calculates with integers. Microprocessors or calculating mechanisms generally operate with $2^n$ digits, generally with eight or sixteen bits. Image region values and frequency region values are advantageously trimmed from real numerical values to integers, i.e. natural numbers including positive or negative signs and the numerical value of zero, i.e. are multiplied with any desired, but defined factor, to exclude decimal points.

Because the number of digits increases for the products of the four matrix multiplications, i.e. several more bits are required in the calculating mechanism after each multiplication, and because the calculating mechanism should be able to operate with the smallest possible word width, e.g. with 8 or 16 bits, the product is rounded off after several or all multiplications and the number of digits is intentionally limited. Generally, the product is rounded down by leaving off the last digits because this can be done without additional expense. However, this causes the amplitude of the pixels, particularly those of the mean value (element K(1,1) in the coefficient matrix) to steadily decrease in the course of the calculations compared to a calculation without rounding off.

Correction circuit 31, which substantially corrects the mean value, prevents too low an amplitude. It has been found in practice that it is sufficient to add a correction value only to the mean value of the coefficient matrix. The correction value MK is calculated from the following numbers:
element K(1,1) of the coefficient matrix itself;
the number N of bits available in the calculating mechanism for the maximum word length;
the number T of bits stored in PROM 30 as the maximum word length for the transformation matrix elements (DCT);
the number D of bits which results from the row (x) and column (y) lengths of the pixel matrix (x plus y).

The pixel matrix may be one-dimensional (x=1 or y=1); it may be two-dimensional square (x=y, $\geq 2$); or it may be two-dimensionally variable (x≠y, x≥2, y≥2).

With $$D=int[log_2(2*(max(x, y))-1]$$

the correction value results as $$MK=K(1,1)+K(1,1)/[2\ exp\ (N-T-D+1)]$$

for the one-dimensional matrix and for the square two-dimensional matrix and as $$MK=K(1,1)+K(1,1)/[2\ exp\ (N-T-D)]$$

for the two-dimensional matrix having columns and rows of different lengths.

Element K(1,1) of a frequency region matrix represents the equal value component and thus is a measure of the brightness of a block. For this equal value component, a correction value MK is calculated in correction circuit 31 and in addition circuit 32 the equal value component and the correction value are added and the sum of both is fed to intermediate memory 33. A delay member 34 delays the mean value and all other coefficients by a time t0 which is necessary to calculate the correction value MK for the mean value. The correction circuit is constructed, according to the equations for MK, of calculating mechanisms as described in the TTL cookbook. Exponentiating means to shift a value in a register. D and the factors [2 exp (N−T−D+1)] and [2 exp (N−T−D)], respectively, are not calculated in correction circuit 31 but are determined as defined values by the matrixes to be employed.

We claim:
1. A method of correcting discrete values transmitted in blocks, comprising the steps of:
   performing at least one mutliplication to obtain at least one product value having a plurality of digits;
   during said step of performing at least one multiplication, limiting the number of digit as of the at least one product value; and
   after said step performing at least one multiplication, adding at least one correction value to the at least one product value.
2. A method as in claim 1, further comprising the steps of transforming values arranged in blocks from an image region to a frequency region and then transmitting the transformed values in blocks, and after the transmission, retransforming the values in blocks in the frequency region back to the image region, said step of transforming including said step of performing at least one multiplication, limiting the number of digits and adding at least one correction value.
3. A method as in claim 2, wherein the values from image region are one of chromaticity values and gray values of a video signal.
4. A method as in claim 2, wherein said step of performing at least one multiplication includes the step of multiplying matrixes.
5. A method as in claim 2, further comprising the step of arranging the blocks of values of the image region so as to be representable by image region matrixes.
6. A method as in claim 5, wherein said step of performing at least one multipication includes the step of multiplying the image region matrixes by another matrix.

7. A method as in claim 5, wherein said step of transforming includes the step of obtaining a coefficient matrix having a mean value element which corresponds to a multiple of the arithmetic mean of all of the elements of an image region matrix.

8. A method as in claim 7, wherein said step of adding at least one correction value include the step of adding a correction value to the mean value element and keeping the remaining elements of the coefficient matrix unchanged.

9. A circuit for correcting discrete values transmitted in blocks, comprising:
   means for performing at least one multiplicaiton to obtain at least one product value having a plurality of digits;
   means, operable during performance of the at least one multiplication by said performing means, for limiting the number of digits of the at least one product value; and
   means, including a correction circuit, for calculating and adding to the at least one product value, at least one correction value, after the performance of the at least one multiplication by said performing means.

10. A circuit as in claim 9, wherein said calculating and adding means includes an addition circuit which adds a correction value to the at least one product value.

11. A circuit as in claim 9, further comprising means for transforming values arranged in blocks from an image region to a frequency region, means for transmitting the transformed values in blocks, means for retransforming the values in blocks in the frequency region transmitted by said transmitting means back to the image region, said transforming means including means for performing at least one multiplication of mulitplying matrixes, said means for transforming including means for obtaining a coefficient matrix having a mean value element whih corresponds to a multiple of the arithmetic means of all of the elements of an image region matrix, said means for calculating and adding including an addition circuit means for adding a correction value to the means value without changing any of the other elements of the coefficient matrix.

12. A circuit as in claim 9, further comprising:
   means for transforming values arranged in blocks from an image region to a frequency region and means for transmitting the transformed values in blocks, wherein the values arranged in blocks are one of chromacity values and gray values of a video signal and the blocks are represented by image region matrixes, said transforming means including means for performing at least one multiplication of each iamge region matrix by a transformation matrix to obtain a coefficient matrix having a mean value element which corresponds to a multiple of the arithmetic mean of all of the elements of the image region matrix, said means for calculating and adding including an addition circuit means for adding a correction value to the mean value without changing any of the elements of the coefficient matrix; and
   means for retransforming the values in blocks in the frequency region transmitted by said transmitting means back to the image region.

13. A method of transmitting discret image data values representing a video signal, comprising the steps of:
   arranged the data values in blocks;
   transforming the data values arranged in blocks from an image region to a freqeuncy region, said step of transforming including the step of performing at least one multiplication of the blocks of data values to obtain at least one product value having a plurality of digits;
   during said step of performing at least one multiplication, limiting by rounding off the number of digits of the at least one product value;
   after said step of performing at least one multiplication, adding at least one correction value to the at least one product value;
   transmitting the transformed values in blocks; and
   after said step of transmitting, retransforming the values in blocks in the frequency region back to the image region.

14. A method as in claim 13, wherein the image data values are one of chromacity values and gray values of the video signal and the blocks of data are represented by image region matrixes, said step of performing at least one multiplication comprising the step of multiplying the image region matrixes by a transformation matrix to obtain a coefficient matrix having as one of its elements a mean value element which corresponds to a multiple of the arithmetic mean of all of the elements of the image region matrix, said step of adding including the step of adding a correction value to the mean value element without changing any of the other elements of the coefficient matrix.

* * * * *